United States Patent
Keen

[11] Patent Number: 6,060,544
[45] Date of Patent: May 9, 2000

[54] CHEMICAL COMPOSITIONS

[75] Inventor: Christopher Victor Keen, Haverhill, United Kingdom

[73] Assignee: Ciba Specialty Chemicals Corp., Tarrytown, N.Y.

[21] Appl. No.: 09/040,989

[22] Filed: Mar. 18, 1998

[51] Int. Cl.[7] .................................. C08J 5/24; C08L 5/23
[52] U.S. Cl. ............................ 524/190; 524/739; 528/52
[58] Field of Search ............................. 523/400; 524/190, 524/739; 528/53, 52

[56] References Cited

U.S. PATENT DOCUMENTS

| | | | |
|---|---|---|---|
| 3,773,706 | 11/1973 | Dunn | 260/37 |
| 4,160,064 | 7/1979 | Nodiff | 428/413 |
| 4,164,492 | 8/1979 | Cooper | 260/40 |
| 4,942,199 | 7/1990 | Gosselin | 524/724 |

FOREIGN PATENT DOCUMENTS

| | | |
|---|---|---|
| 0225843 | 6/1987 | European Pat. Off. . |
| 51109999 | 9/1976 | Japan . |
| 960276 | 6/1964 | United Kingdom . |
| 1399360 | 7/1975 | United Kingdom . |
| 94/28786 | 12/1994 | WIPO . |

OTHER PUBLICATIONS

Derwent Abst 94–001547 (1997).

*Primary Examiner*—Robert Dawson
*Assistant Examiner*—D. Aylward
*Attorney, Agent, or Firm*—Michele A. Kovaleski

[57] ABSTRACT

A multi-pack system which comprises two or more components which react together to form a thermosetting resin characterised in that one of the components contains up to 0.01% by weight of a pH indicator.

7 Claims, No Drawings

CHEMICAL COMPOSITIONS

The present invention relates to multicomponent liquid systems which react to produce such products as thermosetting resins.

Thermosetting resins such as polyurethanes and epoxy resins are widely used, e.g. as adhesives, for making coatings and in tooling applications. In many cases the mixture of the components is very similar in appearance to some or all of the individual components. It is therefore possible to produce products where one or more components are missing, e.g. due to machine breakdown, and for the operator to be unaware of such an occurrence.

Sometimes a dye or pigment is added to a component and it is then possible to ensure proper mixing by observing the colour of the mixture, and comparing it to the colour of the individual component. This normally requires 0.1 to 5% of costly dyestuff or pigment.

We have now surprisingly found that a very small amount of a compound which is normally used as an indicator of pH change, also exhibits a change in colour in the thermosetting systems.

Accordingly the present invention provides a multi-pack system which comprises two or more reactive components which react together to form a thermosetting resin characterised in that one of the reactive components contains up to 0.01% by weight of a pH indicator. Usually the system of the invention will comprise two packs, each of which contains a reactive component.

For example, in the case of polyurethanes, one part will comprise a polyol and the second will comprise a diisocyanate. In the case of epoxides, one part will comprise an epoxy resin and the second will comprise a hardener.

Only very small amounts of indicator are needed to produce a desired colour change. Usually less than 0.01% by weight of the component to which it is added is sufficient. Preferably the amount is from 0.0003% to 0.006%, and more preferably from 0.0005% to 0.004%.

The indicator may be added to any component provided that it does not react with that component and thereby prevent the colour change.

For instance in the case of polyurethanes, many indicators, such as those which contain one or more phenolic groups, will react with isocyanates thereby destroying the chromophore. In this case the indicator should be added to the polyol component.

Similarly in the case of epoxy systems, amines or amine catalysts in the hardener will react with phenolic groups in the indicator which is therefore added to the epoxy component. In the case of high temperature phenolic cured epoxides the indicator may be added to the phenolic hardener.

Any indicator which produces a change in colour when the components are mixed may be used. The indicator however is preferably one which, in aqueous systems, at least begins to change colour at a pH below 8.2. Those that are either strongly coloured in both acid and alkaline states or those that give a strong alkaline colour at low pH values, e.g. below 5.0 are especially preferred. As examples of suitable indicators, there may be mentioned Cresol Red, Bromophenol Blue, Bromocresol Green, Bromocresol Purple, Chlorophenol Red, Phenol Red and Thymol Blue.

It should be noted that the colour change observed is not always the same in different systems and is also not always the same as the colour change produced on changing the pH in an aqueous system. For example, Chlorophenol Red changes from orange to beige in polyurethane systems and from yellow/beige to purple in epoxies. When indicating a pH change the colour change is from yellow to red.

When mixing the two components, the person carrying out the operation can easily see from the colour change that the two components have indeed been mixed, and that the mixing is even throughout the mixture.

The invention is illustrated by the following Examples.

Examples 1–6

Polyurethanes are prepared from a polyol component (A) and component (B) which is semi-distilled liquid 4,4'-methylene diphenyl diisocyanate (MDI) in a ratio of (A):(B) of 100:25 by weight. Component (A) has the composition:

| Polyol Component - (A) | % w/w |
|---|---|
| Castor Oil BP | 32.1 |
| Branched Polyether Polyol - Equivalent Weight 148 (Desmophen 55OU, available from Bayer) | 13.9 |
| Dolomite | 49.0 |
| Fumed Silica | 2.0 |
| Molecular Sieve | 3.0 |

Indicators are added to component (A) as a 0.1% solution in a suitable carrier which is castor oil or a polyol (Lupranol 1000, BASF). The following results are obtained.

| Example | Indicator | % w/w on Component (A) | Colour change on mixing with Component (B) |
|---|---|---|---|
| 1 | Bromophenol Blue | 0.003 | Blue → Beige |
| 2 | Bromocresol Green | 0.003 | Green → Beige |
| 3 | Bromocresol Purple | 0.003 | Yellow → Beige |
| 4 | Cresol Red | 0.003 | Light Yellow → Beige |
| 5 | Chlorophenyl Red | 0.003 | Orange → Beige |
| 6 | Phenol Red | 0.003 | Light Pink → Beige |

Examples 7–11

Cured epoxy resins are produced from epoxy resin component (A) and curative component (B) in a mixing ratio (A):(B) of 100:37 by weight. Component (A) has the composition:

| Epoxy Resin Component - (A) | % w/w |
|---|---|
| Eplchlorohydrin Bisphenol A Epoxy Resin | 31.71 |
| Glycidyl Ether of a $C_{12}$–$C_{14}$ Alcohol | 12.52 |
| Dibutyl Phthalate | 4.15 |
| Sorbitan Monoisostearate | 0.35 |
| Calcium Carbonate | 49.72 |
| Fumed Silica | 1.21 |
| Titanium Dioxide | 0.34 |

-continued

| | % w/w |
|---|---|
| Component (B) has the composition:- Curative Component - (B) | |
| Amine Accelerated Polyaminoamide | 70.00 |
| Tris Dimethylaminomethyl Phenol | 10.00 |
| Benzyl Alcohol | 20.00 |

Indicators are added to component (A) as a 0.1% solution in polyol (Lupranol 1000). The following results are obtained.

| Example | Indicator | % w/w on Component (A) | Colour change on mixing with Component (B) |
|---|---|---|---|
| 7 | Phenol Red | 0.003 | Beige → Pink |
| 8 | Cresol Red | 0.003 | Beige → Light Purple |
| 9 | Bromocresol Purple | 0.003 | Yellow/Beige → Violet |
| 10 | Thymol Blue | 0.003 | Yellow/Beige → Grey/Beige |
| 11 | Chlorophenol Red | 0.003 | Yellow/Beige → Purple |

Examples 12–14

Following the procedure of Examples 1–6 where the ingredients are as given below, MDI being component (B) and the remainder are component (A), the colour change obtained on adding (B) to (A) is as stated.

| Example | 12 | 13 | 14 |
|---|---|---|---|
| N,N,N$^i$,N$^i$- Tetrakis (2-Hydroxypropyl) Ethylene Diamine (Quadrol "L", BASF) | 30 | — | — |
| Branched Polyether Polyol Equivalent Weight 148 (Desmophen 550U, Bayer) | — | 44 | — |
| Castor Oil No. 1 | — | — | 44 |
| Highly Reactive Polyether Triol (Lupranol 2042, BASF) | 64 | — | — |
| Dolomite | — | — | 50 |
| Calcium Carbonate | — | 50 | — |
| Molecular Sieve | 3 | 3 | 3 |
| Thymol Blue (0.1% in Lupranol 1000) | 3 | — | — |
| Bromophenol Blue (0.1% in Lupranol 1000) | — | 3 | — |
| Bromocresol Green (0.1% in Lupranol 1000) | — | — | 3 |
| Modified MDI (Lupranat MP102, BASF) | 80.5 | — | — |
| Semi-Distilled MDI (Lupranat M20S, BASF) | — | 40 | — |
| Semi-Distilled MDI (Desmodur 44V20L, Bayer) | — | — | 17 |
| Colour Change | Yellow-Cream/White | Blue-Beige | Grey/Green-Beige |

Examples 15–18

Different amounts of indicator are used in one polyurethane system to show the different colour changes. The ingredients used and the colour changes are as follows

| Example | 15 | 16 | 17 | 18 |
|---|---|---|---|---|
| N,N,N$^i$N$^i$-Tetrakis(2-Hydroxy Propyl) Ethylene Diamine (Quadrol "L", BASF) | 30 | 30 | 30 | 30 |
| Highly Reactive Polyether Triol (Lupranol 2042, BASF) | 64 | 64 | 64 | 64 |
| Molecular Sieve | 3 | 3 | 3 | 3 |
| Bromophenol Blue | 0.006 | 0.001 | 0.0005 | 0.0003 |
| Semi-Distilled MDI (Desmodur 44V20L, Bayer) | 59 | 59 | 59 | 59 |
| Colour Change on adding MDI From To | Deep Blue → Light Blue | → → | Very Light Blue → Colourless | |

What is claimed is:

1. A multi-pack system containing two or more components, which system comprises a polyol as one component and an isocyanate as a second component, which components react together to form a thermosetting resin characterized in that the polyol component contains up to 0.01% by weight of a pH indicator.

2. The system of claim 1 in which the amount of indicator is from 0.003% to 0.006% by weight.

3. The system of claim 1 or 2 in which the indicator is one which, in aqueous systems, at least begins to change colour at a pH below 8.2

4. The system of claim 1 in which the indicator is one which is strongly colored in both acid and alkaline states.

5. The system of claim 1 in which the indicator is one which gives a strong alkaline color at pH values below pH 5.0.

6. The system of claim 1 in which the indicator is Cresol Red, Bromophenol Blue, Bromocresol Green, Bromocresol Purple, Chlorophenol Red, Phenol Red or Thymol Blue.

7. A multi-pack system according to claim 1 containing 4,4'-methylene diphenyl diisocyanate as the isocyanate component and castor oil, a polyether polyol or N,N,N',N'-tetrakis(2-hydroxypropyl) ethylene diamine as the polyol component.

* * * * *

UNITED STATES PATENT AND TRADEMARK OFFICE
CERTIFICATE OF CORRECTION

PATENT NO. : 6,060,544
DATED : MAY 9, 2000
INVENTOR(S) : CHRISTOPHER VICTOR KEEN.

It is certified that error appears in the above-indentified patent and that said Letters Patent is hereby corrected as shown below:

On the title page, Section [30] should read:

-- [30]      Foreign Application Priority Data

Mar. 26, 1997    [GB]   United Kingdom    9706223.6 --.

Signed and Sealed this

Third Day of April, 2001

Attest:

NICHOLAS P. GODICI

Attesting Officer      *Acting Director of the United States Patent and Trademark Office*